United States Patent
Rakshit et al.

(10) Patent No.: US 12,548,563 B2
(45) Date of Patent: Feb. 10, 2026

(54) CONTEXTUAL ATTENTION ACROSS DIVERSE ARTIFICIAL INTELLIGENCE VOICE ASSISTANCE SYSTEMS

(71) Applicant: INTERNATIONAL BUSINESS MACHINES CORPORATION, Armonk, NY (US)

(72) Inventors: Sarbajit K. Rakshit, Kolkata (IN); Sridevi Kannan, Katupakkam (IN); Sathya Santhar, Ramapuram (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 867 days.

(21) Appl. No.: 17/568,301

(22) Filed: Jan. 4, 2022

(65) Prior Publication Data
US 2023/0215430 A1 Jul. 6, 2023

(51) Int. Cl.
*G10L 15/22* (2006.01)
*G10L 15/30* (2013.01)
*G10L 15/34* (2013.01)

(52) U.S. Cl.
CPC ............ *G10L 15/22* (2013.01); *G10L 15/30* (2013.01); *G10L 15/34* (2013.01); *G10L 2015/225* (2013.01)

(58) Field of Classification Search
USPC .............. 704/246, 247, 251, 252, 270, 275
See application file for complete search history.

(56) References Cited

U.S. PATENT DOCUMENTS

| | | | |
|---|---|---|---|
| 10,536,287 B1 * | 1/2020 | Leblang | G10L 15/22 |
| 11,038,924 B2 * | 6/2021 | Quintas | G06F 21/44 |
| 11,929,065 B2 * | 3/2024 | Iacobelli | G10L 15/30 |
| 2017/0358305 A1 * | 12/2017 | Kudurshian | G06F 16/685 |
| 2018/0088902 A1 * | 3/2018 | Mese | G10L 15/22 |
| 2018/0204569 A1 | 7/2018 | Nadkar et al. | |
| 2019/0212976 A1 | 7/2019 | Fountaine | |
| 2019/0235887 A1 * | 8/2019 | Hemaraj | G06F 3/167 |
| 2019/0341031 A1 | 11/2019 | Cox et al. | |
| 2019/0355363 A1 * | 11/2019 | Nelson | G10L 15/26 |

(Continued)

OTHER PUBLICATIONS

Mell, Peter, et al., "The NIST Definition of Cloud Computing," Sep. 2011, 7 pages.

*Primary Examiner* — Leonard Saint-Cyr
(74) *Attorney, Agent, or Firm* — Tutunjian & Bitetto, P.C.; Michael A. Petrocelli

(57) ABSTRACT

An artificial intelligence that registers users to a common distributed computing platform that provides access to a plurality of voice assistants. A first command issued by a user is received by a first voice assistant of the plurality of voice assistants at a first location. A context database is built by storing the at least the first command on the distributed computing platform. A second command issued by the user is received by a second voice assistant of the plurality of first assistants at a second location. A context assigning engine on the common distributed computing platform analyzes the second command in comparison with the at least the first command on the context database. Similarity between the first command and the second command provides context. The second voice assistant receiving the context from the context assigning engine employs the context to answer the second command.

20 Claims, 7 Drawing Sheets

(56) References Cited

U.S. PATENT DOCUMENTS

2020/0357410 A1   11/2020  Lang et al.
2021/0249009 A1*  8/2021  Manjunath .......... G10L 15/1815
2022/0246146 A1*  8/2022  Nouri ...................... G10L 25/63

* cited by examiner

CONTEXTUAL ATTENTION ACROSS DIVERSE ARTIFICIAL INTELLIGENCE VOICE ASSISTANCE SYSTEMS

BACKGROUND

The present disclosure generally relates to artificial intelligence (AI) voice assistance systems, and more particularly to methods for using multiple AI voice assistance systems.

Voice based assistants that interact with a user through audio/voice input and output have grown in popularity alongside the growth of the Internet and cloud computing. These assistants can provide an interface for the consumption of digital media, as well as providing various types of information, including news, sports scores, weather, and stocks, to name a few examples.

SUMMARY

In accordance with one aspect of the present disclosure, a computer-implemented method is described for using artificial intelligence voice assistants. In one embodiment, the computer implemented method may begin with registering a user to a common distributed computing platform that provides access to a plurality of voice assistants, wherein each voice assistant is assigned to a location. In a following step, at least a first command issued by a user is received by a first voice assistant of the plurality of voice assistants at a first location. The method further includes building a context database by storing the at least the first command on the distributed computing platform. At least a second command issued by the user is received by a second voice assistant of the plurality of first assistants at a second location. A context assigning engine on the common distributed computing platform analysis the second command in comparison with the at least the first command on the context database, wherein similarity between the at least the first command and the second command provides context. The second voice assistant receiving the context from the context assigning engine and employing the context to answer the second command.

In another aspect, a system is described for using artificial intelligence voice assistants. In one embodiment, the system can include a hardware processor; and a memory that stores a computer program product. The computer program product when executed by the hardware processor, causes the hardware processor to register a user to a common distributed computing platform that provides access to a plurality of voice assistants, wherein each voice assistant is assigned to a location. The computer program product can also receive at least a first command issued by a user to a first voice assistant of the plurality of voice assistants at a first location. The computer program product of the system can also use a hardware processor to build a context database by storing the at least the first command on the distributed computing platform. The computer program product of the system can also use the hardware process to receive at least a second command issued by the user that is received by a second voice assistant of the plurality of first assistants at a second location. The system also includes a context assigning engine on the common distributed computing platform for analyzing the second command in comparison with the at least the first command on the context database, wherein similarity between the at least the first command and the second command provides context. The system can also second the context from the context assigning engine to the second voice assistant, and employ the context to answer the second command.

In yet another aspect, a computer program product is described for using artificial intelligence voice assistants. The computer program product can include a computer readable storage medium having computer readable program code embodied therewith. The program instructions executable by a processor to cause the processor to register a user to a common distributed computing platform that provides access to a plurality of voice assistants, wherein each voice assistant is assigned to a location. The computer program product can also using a hardware processor receive at least a first command issued by a user to a first voice assistant of the plurality of voice assistants at a first location. The computer program product can also use a hardware processor to build a context database by storing the at least the first command on the distributed computing platform. The computer program product can also use the hardware process to receive at least a second command issued by the user that is received by a second voice assistant of the plurality of first assistants at a second location. The computer program product also includes a context assigning engine on the common distributed computing platform for analyzing the second command in comparison with the at least the first command on the context database, wherein similarity between the at least the first command and the second command provides context. The computer program product can also second the context from the context assigning engine to the second voice assistant, and employ the context to answer the second command.

BRIEF DESCRIPTION OF THE DRAWINGS

The following description will provide details of preferred embodiments with reference to the following figures wherein.

DETAILED DESCRIPTION

Figure 1:
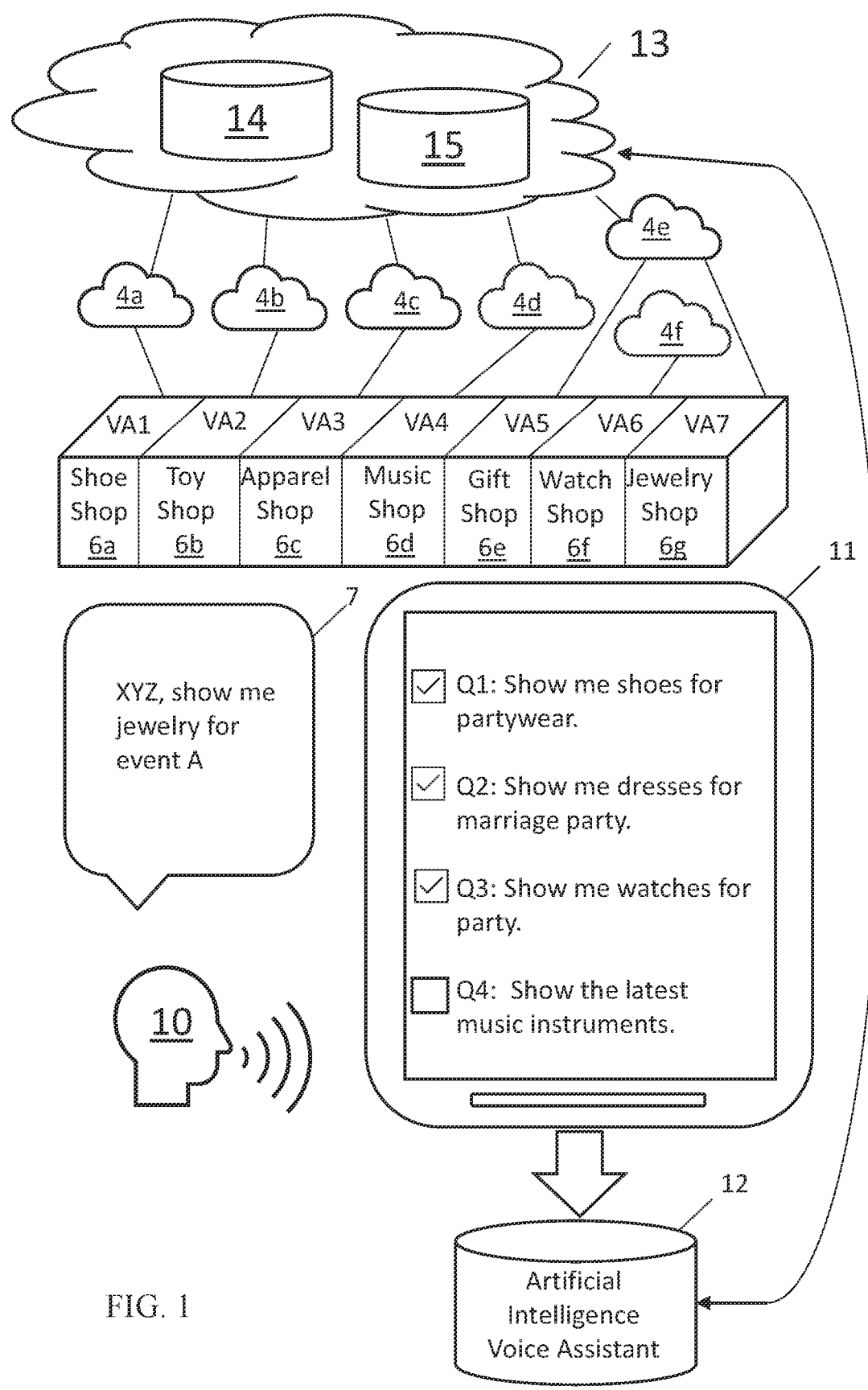
FIG. 1 illustrates an environment in which multiple artificial intelligence voice assistance service providers are operating, in accordance with some embodiments of the present disclosure.

The methods, systems, and computer program products described herein relate to multi artificial intelligence (AI) voice assistance system that identify the context of the conversation through aggregated information from different AI systems. The methods, systems and computer program products that are described herein can provide contextual conversation with the user without getting the context repeated despite the user interacting with multiple artificial intelligence systems.

In any multi-artificial intelligence voice assistance environment, such as a larger shopping floor, shopping complex, or a space spanning different floors of a shopping complex etc., there can be different artificial intelligence voice assistance service providers. In these scenarios, the customer can move from one location to another location, e.g., one floor to another floor etc., so when the customer performs a voice interaction in one area with a first provider of artificial intelligence voice assistance services, and then makes a change in a device or service provider, e.g., a change from a first service provider to a second service provider, which results from a change in location, the customer will be have difficulty completing the task that started with the initial voice interaction with the first provider. In prior scenarios, because the user has left the area in which the voice interaction with the first service provider of artificial intelligence (AI), in order to complete the original task that was intended to be performed with the first service provider, the user may have to repeat the entirety of the voice interaction that the user had started with the first artificial intelligence voice assistant service provide with a second artificial intelligence voice assistant service provider.

The methods, systems and computer program products of the present disclosure can provide context carryover between the multiple artificial intelligence voice assistants. In some embodiments, virtual accounts are created for each user when entering a premise with definite expiry based on the number of artificial intelligence voice assistant service providers to be handled. The expiry can also be determined by the user if there is any need to hold the conversation till the goal is accomplished. A combination of user defined unique trigger words and voice signature is used to awaken any voice enable assistants to handle the specific customer. In some embodiments, the trigger word is made common across all the digital assistants. The virtual account holds all the conversations along with device identification.

In some embodiments, when a user submits a voice command to any artificial intelligence (AI) voice assistance service provider, the proposed system will identify the conversations linked to the virtual account, and accordingly the proposed system will be aggregating the individual voice command to build the context.

In some embodiments, the artificial intelligence model within the voice assistant can have multiple stages. In the first stage, the classifier network would accept the current instruction/question from the user and would predict if there is a context involved. If there is no reference to previous context, then the system directly answers the user. If there is context built and if the context is not within the scope of the device, then it triggers the next stage of attention layers.

In some embodiments, the attention stage would have inputs from the two (2) sentences—one being the sentence in question, and the other being the previous sentence. The attention model would predict if there is any contextual dependency between these two (2) sentences. If there is any, then the word from one sentence and its dependent words from other sentence are given as outputs. If there is no context built, then the previous sentence is taken, and the loop continues.

In some embodiments, if there is any context identified between two (2) sentences, and even if the contextual dependencies are identified, the process is repeated to identify any contextual dependency between n-1 and n-2th sentences, and all the contexts are sent back to the voice assistant system to respond back to the user.

In some embodiments, the system can be extended to different boundaries. For example, the system can extend to different shops within a mall of shops with devices having different virtual accounts for the same user. The system has the help of super account model and user giving access for the model to access the conversations across the virtual accounts. The super account can also be a model that can accept the request from voice assistants for the context required and super account can retrieve the previous sentences from virtual accounts and follow the same process as explained above. The methods, systems and computer program products are now described in greater detail with reference to FIGS. 1-7.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates an environment in which multiple artificial intelligence voice assistance service providers are operating, e.g., a shopping mall, a conference center, etc. The environment 100 may be any location that may house providers of goods and services. In one example, the environment may include multiple consumer goods vendors. For example, the environment may include a shoe shop 6a, a toy shop 6b, an apparel shop 6c, a music shop 6d, a gift shop 6e, a watch shop 6f and a jewelry shop 6g. It is noted that these are only examples of the types of shops may be present in the environment, and it is not intended that the present example be limited to only this example. In some embodiments, each of the vendors 6a, 6b, 6c, 6d, 6e, 6f, 6g employ an artificial intelligence (AI) voice assistant 5a, 5b, 5c, 5d, 5e, 5f, 5g that is different from the other vendors. In the embodiment, the cloud provider 4a, 4b, 4c, 4d, 4f is specific to the majority of the voice assistants 5a, 5b, 5c, 5d 5f. However, embodiments have been considered in which a single cloud provider 5e is hosting at least two different voice assistants, e.g., the voice assistants having reference numbers 5e and 5g.

Each of the different providers for the different voice assistants may be communication with a common distributed computing platform 13 that provides access to a plurality of voice assistants, wherein each voice assistant is assigned to a location. The common distributed computing platform 13 includes a context database 14 for storing a plurality of commands employed by users with artificial intelligence voice assistants. A context assigning engine 15 is also present on the common distributed computing platform 13, in which the context assigning engine 15 can analyze the commands being received by the artificial intelligence voice assistants and compare the commands with previously received and recorded commands, such as those saved in the context database 14, in which similarity between commands provides context. The common distributed computing platform 13 may be a cloud-based system. The common distributed computing platform 14 may be in communication with the distributed computing network 4a, 4b, 4c, 4d, 4e, 4f that provides services to the individual artificial intelligence voice assistant service providers.

In the example depicted in FIG. 1, a user 10 in one of the vendors, e.g., shopping within the place of business of a vendor, within the environment 100 begins to use the services of a voice assistance, e.g., voice assistant 12, by issuing a voice command 7. In one example, the voice command 7 may be "Voice assistant name XYZ, show me jewelry for occasion type A". The user 10 may be interacting with a voice assistant 12 through a mobile device 11. In this example, the user 10 may be traveling across a plurality of different vendors. In some embodiments, the methods, systems and computer program products that are described herein employ a system, e.g., a common distributed computing platform 13 including the context database 14 and context assigning engine 15, that provides for a carry-over of context from a first artificial intelligence voice assistant that is employed in a first vendor location to at least second artificial intelligence. In determining context, the system may consider prior inquiries, e.g., commands, by the user 10 while interacting with artificial intelligence voice assistants. The different artificial intelligence voice assistants are identified by VA1, VA2, VA3, VA4, VA5, VA and VA7 in FIG. 1.

For example, referring to FIG. 1, the command history of the user 10 may include inquiries such as: Question 1) "Show me shoes for partywear", Question 2) "show me dresses for party"; and Question 3) "show me watches for party", as well as Question 4) "Show the latest music instruments".

In this example, the user 10 may select from the command history, the commands that the user 10 would like considered for carry over context purposes when the user is traveling from one vendor to another, and that traveling results in the user changing artificial intelligence voice assistants. In the example, depicted in FIG. 1, the user 10 has selected Questions 1, 2 and 3 for providing context. Question 4 is not identified as providing proper context. From this input, the system can employ the context from the first interactions with a first voice assistant.

In some embodiments, the questions (also referred to as commands) for the interactions with the artificial intelligence voice assistants may be recorded in the context database 14.

In the example depicted in FIG. 1, the conversation contents can be selectively shared to get consolidated voice command, as provided by the common distributed computing platform 13 that includes the context database 14 and the context assigning engine 15. The process flow for providing a consolidated voice command is now described with reference to FIG. 2.

Figure 2:
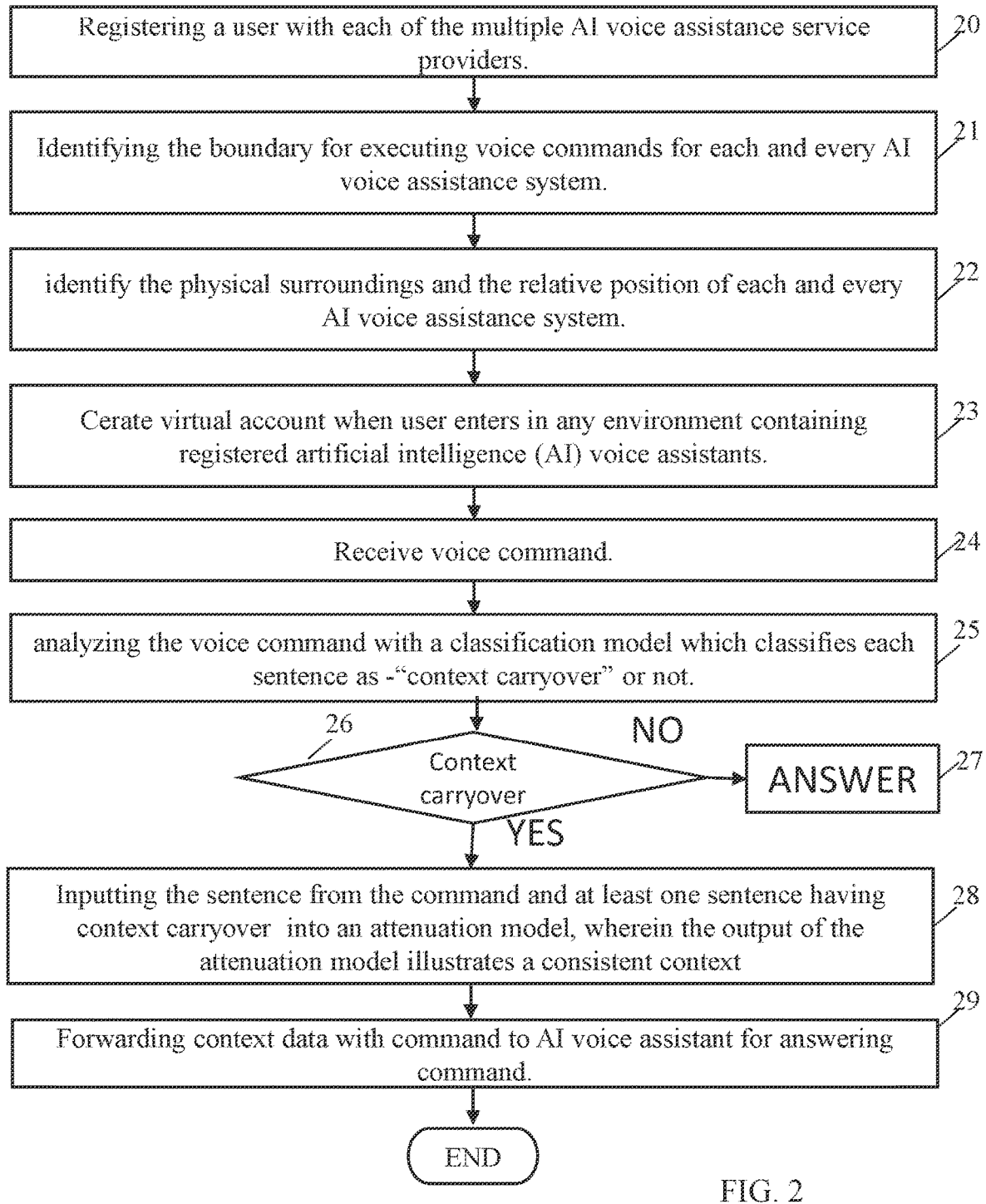
FIG. 2 is a detailed flow/block diagram showing one embodiment a method for employing context across diverse artificial intelligence voice assistance systems, in accordance with some embodiments of the present disclosure.

Referring to block 20 of FIG. 2, the method may be employed in any environment in which there can be multiple AI voice assistance service providers.

Figure 3:
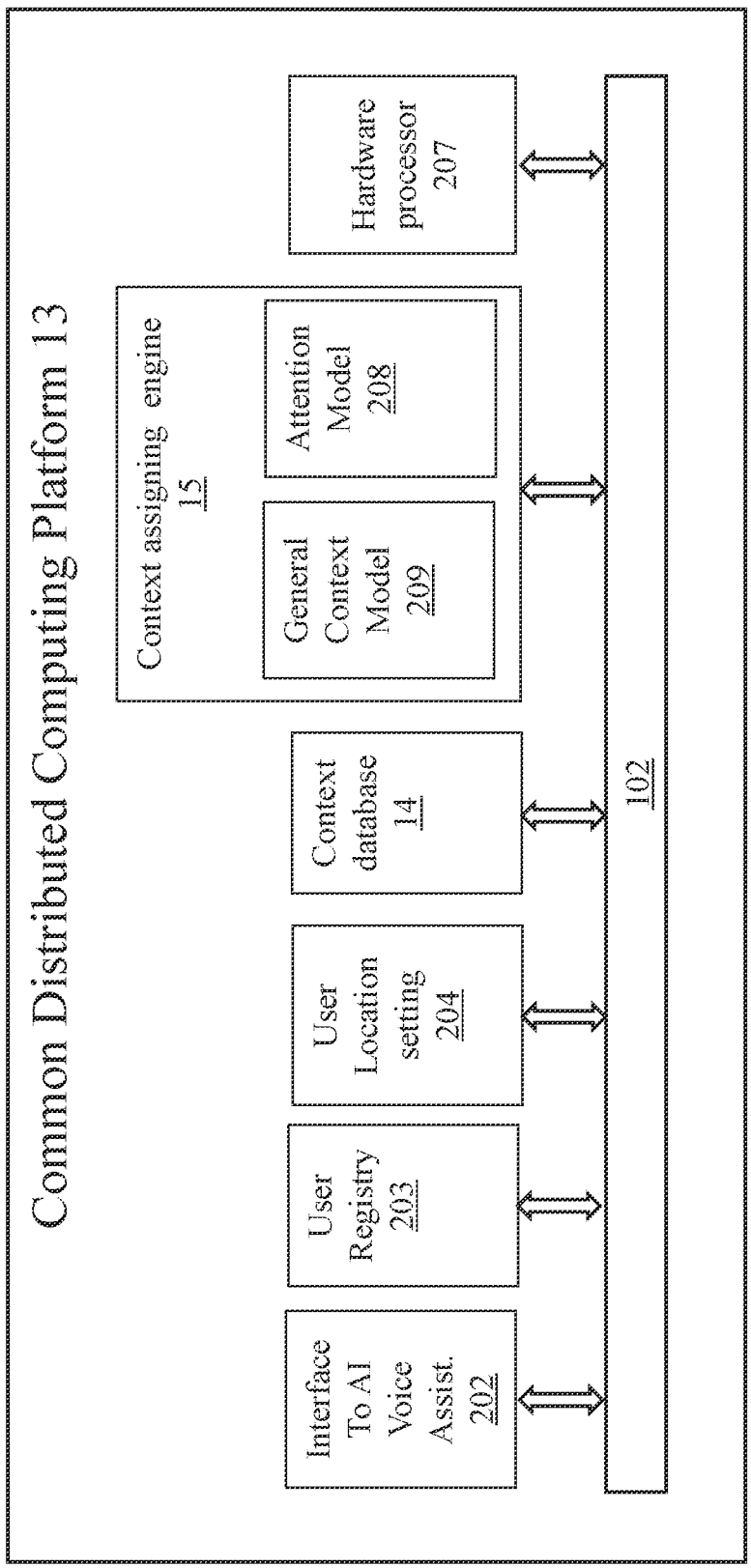
FIG. 3 is a block diagram depicting one embodiment of a system for employing context across diverse artificial intelligence voice assistance systems, in accordance with some embodiments of the present disclosure.

At block 20, the method may begin with registering a user with each of the multiple AI voice assistance service providers 4a, 4b, 4c, 4d, 4e, 4f. The users 10 and the AI voice assistance providers 4a, 4b, 4c, 4d, 4e, 4f are both in communication with the common distributed computing platform 13 that includes the context database 14 for storing a plurality of commands employed by the users 10 with artificial intelligence voice assistants. Registering the user 10 includes assigning the user 10 with a unique identifier. The unique identifier is used by the mobile device 11 of the user to communicate to a voice assistant that the user 10 can employ the common distributed computing platform 13 for extending the context of a voice assistant interaction that started with a first artificial intelligence voice assistant with at least a second artificial intelligence voice assistant, as the user 10 moves from one location to another, e.g., as the user is shopping between multiple vendors. The user 10 during registration can also establish a "trigger" that is unique to the user for starting voice assistant interactions with the common distributed computing platform 13. A combination of user defined unique trigger words and voice signature can used to awaken any voice enable assistants to handle the specific customer. In some embodiments, the trigger word is made common across all the digital assistants. The virtual account holds all the conversations along with device identification. The user identity 10, the identity and location of virtual assistants VA1, VA2, VA3, VA4, VA5, VA6, VA7, and the unique triggers that are associated to the user identities 10 are all information that can be saved in a user registry 203 of the common distributed computing platform 13, as depicted in FIG. 3. FIG. 3 is a block diagram depicting one embodiment of a system, e.g., common distributed computing platform 13, for employing context across diverse artificial intelligence voice assistance systems, in accordance with some embodiments of the present disclosure.

In some instances, registering the user can involve collecting certain user data. To the extent that implementations of the methods, systems and computer program products collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Referring to block 21 of FIG. 2, in a following step, the method may continue with identifying the boundary for executing voice commands for each and every AI voice assistance system VA1, VA2, VA3, VA4, VA5, VA6, VA7. By identifying the boundaries, it can be determined which AI systems may have to share context relative to the user's location. This information may be received from the AI voice assistance systems VA1, VA2, VA3, VA4, VA5, VA6, VA7, as well as each of the multiple AI voice assistance service providers 4a, 4b, 4c, 4d, 4e, 4f. The information can be received by the common distributed computing platform 13 through the interface 202 depicted in FIG. 3.

Turning to block 22 of FIG. 2, in addition to the reach of voice commands relative to the different artificial intelligence voice assistant systems VA1, VA2, VA3, VA4, VA5, VA6, VA7, the method may also identify the physical surroundings, e.g., the vendor retail space 6a, 6b, 6c, 6d, 6e, 6f, 6g, and the relative position of each and every AI voice assistance system. In any physical surrounding, the physical position of each of the AI voice assistance system will be identified based on indoor positioning.

At block 23 of FIG. 2, the method may continue with when a user 10 enters in any environment containing registered artificial intelligence (AI) voice assistants, e.g., vendors 6a, 6b, 6c, 6d, 6e, 6f, 6g, then the proposed system will be creating a virtual account for the user 10 with defined expiry for each type of voice system and a unique trigger word along with voice signature is created for each user. The virtual account can be by installing an application on the mobile device 11 of the user 10, or by user 10 scanning a QR code or by any other available mechanism using their mobile device as they enter an environment containing the registered artificial intelligence (AI) voice assistance. It is noted that this is only one example, of how the user 10 may start the system for employing context across diverse artificial intelligence voice assistance systems. Other examples are equally suitable. For example, a smartwatch user can also specify a gesture to define what gesture will be performed for wakeup of the system for employing context across diverse artificial intelligence voice assistance systems when the user enters a region at which voice commands can be received. Based on the defined wakeup command for the user, the each of the AI voice assistance systems will be configured with the same wakeup command. In the multi-AI voice assistance service provider surrounding, each and every AI voice assistance system will be acting as an Internet of Things (IoT) device, and will be sharing the information with each other.

Determining when a user enters in any environment containing registered artificial intelligence (AI) voice assistants, e.g., vendors 6a, 6b, 6c, 6d, 6e, 6f, 6g, may be achieved by a virtual assistant receiving a comments that is specifically assigned to the vendor. However, this is not the only mechanism by which a user location is identified. The location of the user can be confirmed using the GPS signal of the user 10 via the user's mobile device 11 that is running the application for communicating with the common distributed computing platform 13. FIG. 3 illustrates a user location setting 204 of the common distributed computing platform 13, in which user location is stored for the interaction with the voice assistants for the purposes of analyzing user location for carry over context.

Referring to block 24 of FIG. 2, in a following step, a voice command is received from the user 10. The voice command is received by the artificial intelligence voice assistant 12, which may interface through the mobile device 11 of the user. The artificial intelligence voice assistant 12 has a provider that is in communication with the common distributed computing platform 13 through interface 202, as depicted in FIG. 3.

In some examples, the voice assistance system architecture where the initial network would accept every command and would identify if there is any contextual information needed. The voice assistance system can analyze the question, with a classification model which classifies each sentence as "context carryover" or not at block 25. The common distributed computing platform 13 includes a context database 14 and a context assigning engine 15. The context assigning engine 15 employ an artificial intelligence model that determines from the list of questions a user 10 has previously asked a virtual assistant whether those questions provide for context to later commands, i.e., questions. The list of questions can be provided by historical recorded questions from the context database 14. In other embodiments, the user 10 can identify questions from their history of interactions with artificial intelligence voice assistances for providing context. In other embodiments, the system can track questions for a specific time period and employ those questions within the time period for determining context.

Determining the presence of context may be provided by the context assigning engine 15. The context assigning engine 15 may employ a neural network to provide artificial intelligence for identifying context from the questions collected from the user, which may be stored in the context database. In some examples, the context database 14 provides the data for training the classifier of the artificial intelligence model provided through the neural network for identifying context in the questions present by the user to the artificial intelligence voice assistant.

Figure 4:
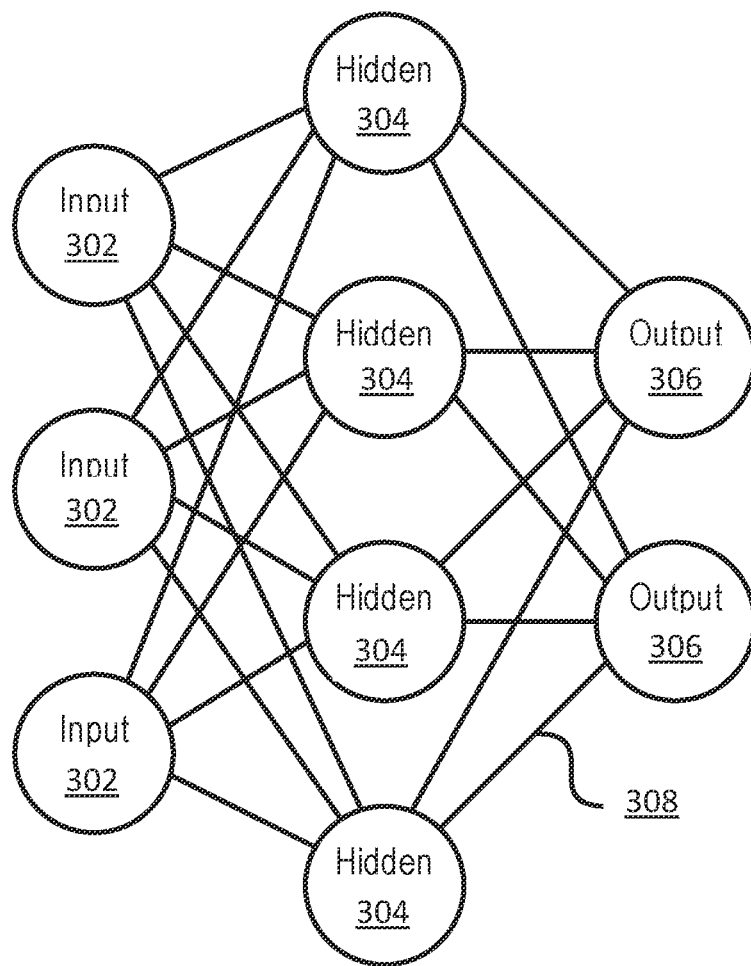
FIG. 4 is a generalized diagram of a neural network.

FIG. 4 illustrates one example of a neural network. FIG. 4 is an illustration of an example environment illustrating a neural network for an artificial intelligence model. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead. In the present case the output neurons 306 provide analysis of whether a package has been handled correctly according to the data provided from the input of the IoT sensors.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the streaming plan generator 303 trains to match search items extracted from definitions for requirements used in the requirement management tool to source code that is stored in repositories.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Alternatively, the weights 308 may be implemented as resistive processing units (RPUs), generating a predictable current output when an input voltage is applied in accordance with a settable resistance.

The artificial intelligence models of the context assigning engine 15 include a generic classification model and an attention model.

The classification model is a fully connected neural network with softmax layer as output to classify each sentence as "context carryover" or not. The classification model is achieved by training the neural network with softmax on the historical data of the context carry over sentences.

For example, a non-context carry over sentence is as follows: "Show me a blue color shirt". In this example, the color of the shirt is explicitly mentioned so there is no context carried over from previous sentence.

For example, a context carry over sentence is as follows: "Show me a shirt that matches my phone". In this example, the color of the shirt depends on the phone color, which is not explicit in the given sentence". In this example, a context of "Phone color" has been carried over to this sentence. To provide the proper context, the context assigning engine 15 may have to analyze further questions collected from the user, which may be stored in the context database 14.

In some embodiments, the generic classification model is fully trained on multiple sentences of data carrying the context to enable it to identify the context carryover sentences in the validation phase. In some embodiments, the softmax layer classifies whether the input sentence carries the context (YES) or doesn't (NO) at block 26.

If there is no need for additional context, the method may continue with the artificial intelligence voice assistant answering the user question at block 27.

If there is a context associated (YES), then it enters the next stage of the model which is the Attention model at block 28.

Referring to block 28, at the attention stage there can be multiple inputs, e.g., from two (2) sentences—one being the sentence in question (Current sentence 'n') and the other being the previous sentence (Previous sentence 'n−1'). In one example, as indicated with the above description of FIG. 1, the user identifies commands from the history of interaction with the voice assistants of any commands that provide context.

In some embodiments, the attention model (e.g., Bidirectional LSTM) takes in the input query from the user and understands the context to determine the context carryover words in the current sentence and whether the contextual word is related to the previous sentence (n−1) which is also provided as input. Bidirectional long, short term memory (BI-LSTM) is a type of long, short term memory (LSTM model) that processes the data in both forward and backward direction. In bi-directional, we can make the input flow in both directions to preserve the future and the past information.

Bi-LSTM model modules including an encoder, attention layer, and a decoder. The Bi-LSTM model includes at least two separate LSTMs in this model. The Encoder takes in the word embeddings of the user (current and previous sentences) and has pre-attention bidirectional LSTM network.

Because the encoder is a Bi-directional LSTM and comes before the attention mechanism, it can be referred to as a pre-attention Bi-LSTM. The pre-attention Bi-LSTM goes through Tx time steps.

The attention layer takes in the output of the encoder and calculates the attention score based on the context of the query. Where the encoder reads and summarizes the sequential data, and the summarized part gets weights from the attention layer of the model so that the decoder state can translate it better and model can predict it better. The step are as follows: Step 1: Compute a score each encoder state; Step 2: Compute the attention weights; Step 3: Compute the context vector; and Step 4: Concatenate the context vector with output of previous time step.

The context vector ci for the output word yi is generated using the weighted sum of the annotations, as follows:

$$Ci = \sum_{j=1}^{T_x} a_{ij} h_j \qquad \text{Equation (1)}$$

The weights are computed by a softmax function given by the following equations:

$$a_{ij} = \frac{\exp(e_{ij})}{\sum_{k=1}^{T_x} \exp(e_{ik})} \qquad \text{Equation (2)}$$

$$e_{ij} = (s_i - 1, h_j) \qquad \text{Equation (3)}$$

The decoder takes in the output of the attention layer and has post-attention bidirectional LSTM network. The LSTM comes after the attention mechanism, so can be referred to as post-attention LSTM. The post-attention LSTM goes through Ty time steps.

The output of the bidirectional LSTM attention model identifies the context carryover words from the current sentence and determines if the contextual word is related to the 'n−1' previous sentence.

The attention model would predict if there is any contextual dependency between these 2 sentences (current sentence 'n' and previous sentence 'n−1').

If there is any, then the word from one sentence and its dependent words from other sentence are given as outputs.

If there is no context built, then the previous sentence (n−2) is taken, and the loop continues from step #8.

If there is any context identified between 2 sentences and even if the contextual dependencies are identified, the process is repeated to identify any contextual dependency between n−1 and n−2th sentences and all the contexts are sent back to the voice assistant system to respond back to the user.

This way the contextually carried over words are identified from the current sentence and the appropriate response would be sent by the virtual assistant to the user.

Referring to block 27, the method may continue with inputting the sentence from the command and at least one sentence having context carryover into an attenuation model, wherein the output of the attenuation model illustrates a consistent context The attention model would predict if there is any contextual dependency between these 2 sentences. If there is any, then the word from one sentence and its dependent words from other sentence are given as outputs. If there is no context built, then the previous sentence is taken, and the loop continues. If there is any context identified between 2 sentences and even if the contextual dependencies are identified, the process is repeated to identify any contextual dependency between n−1 and n−2th sentences and all the contexts are sent back to the voice assistant system to respond back to the user.

Referring to block 28, the context data may be forwarded with the command to AI voice assistant in the location at which the users is present for answering command.

In some embodiments, the method and systems described herein provide a multi-AI voice assistance system that can identify the context of the conversation through aggregated information from different AI systems and can provide contextual conversation with the user without the context being unnecessarily repeated.

FIG. 3 is a block diagram depicting one embodiment of a system, e.g., common distributed computing platform 13 that includes a context database 14 and a context assigning engine 15, for employing context across diverse artificial intelligence voice assistance systems. In one embodiment, the system can include a hardware processor 207; and a memory that stores a computer program product. The computer program product when executed by the hardware processor, causes the hardware processor to register a user to a common distributed computing platform 13 that provides access to a plurality of voice assistants, wherein each voice assistant is assigned to a location. The system includes an interface to the voice assistants 202 for receiving this information.

The system can also receive at least a first command issued by a user to a first voice assistant of the plurality of voice assistants at a first location. The computer program product of the system can also use a hardware processor 204 to build a context database 14 by storing the at least the first command on the distributed computing platform 13. The computer program product of the system can also use the hardware process 207 to receive at least a second command issued by the user that is received by a second voice assistant of the plurality of first assistants at a second location. The system also includes a context assigning engine 15 on the common distributed computing platform 13 for analyzing the second command in comparison with the at least the first command on the context database 14, wherein similarity between the at least the first command and the second command provides context. The system can also second the context from the context assigning engine to the second voice assistant, and employ the context to answer the second command.

Figure 5:
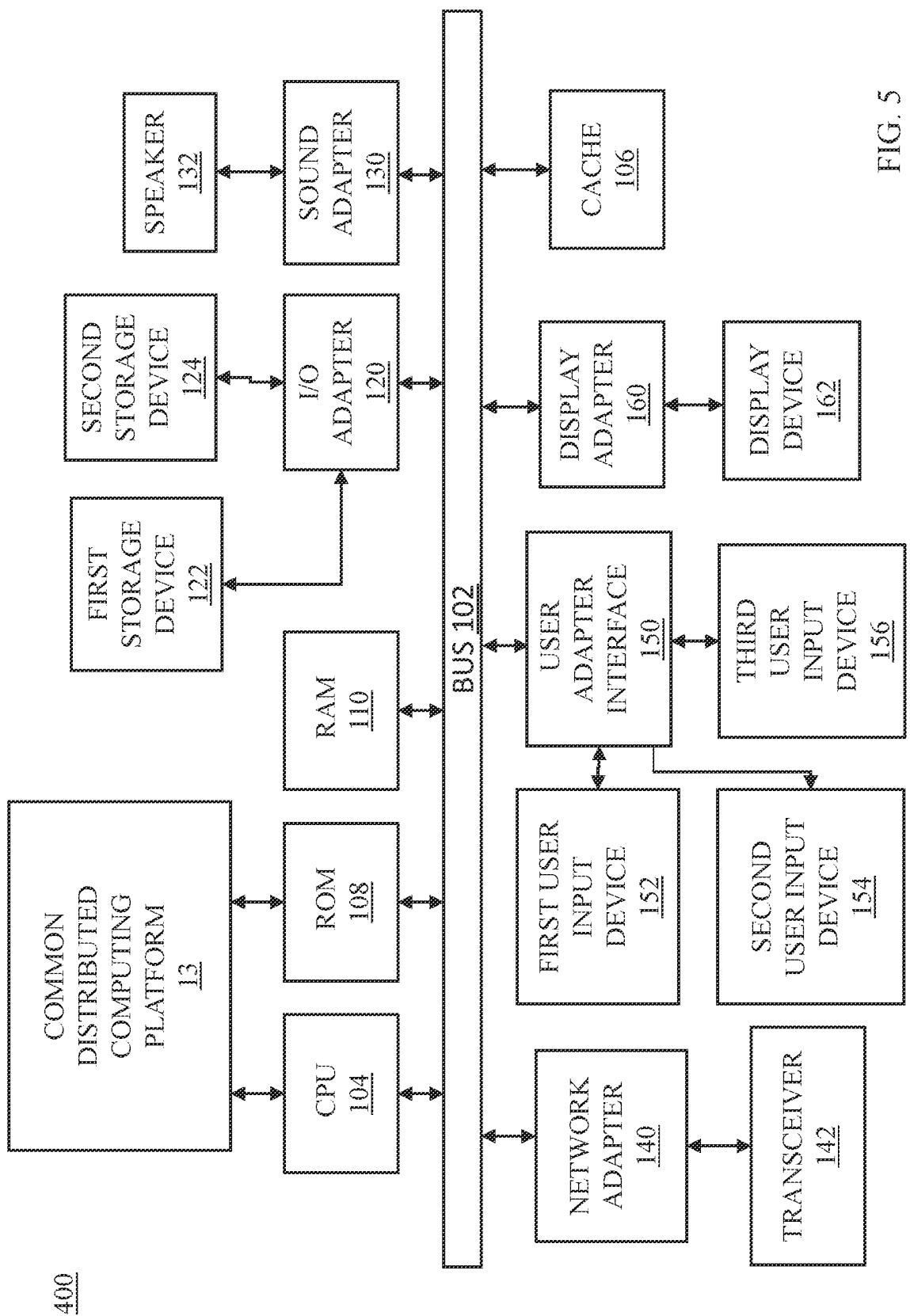
FIG. 5 is a block diagram illustrating a system that can incorporate the system for employing context across diverse artificial intelligence voice assistance systems that is depicted in FIG. 3, in accordance with one embodiment of the present disclosure.

FIG. 5 illustrates a processing system 400 used by or comprised by the system, e.g., common distributed computing platform 13 that includes a context database 14 and a context assigning engine 15, for employing context across diverse artificial intelligence voice assistance systems, in accordance with the methods and systems described above in FIGS. 1-4. The bus 102 interconnects the plurality of components for the system 100 described above with the components depicted in the computer system 400 depicted in FIG. 5.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 5 shows the computer system 400 as a particular configuration of hardware and software, any configuration of hardware and software, as would be known to a person of ordinary skill in the art, may be utilized for the purposes stated supra in conjunction with the particular computer system 100 of FIG. 4. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for using artificial intelligence voice assistants. The non-transitory computer readable program when executed on a computer causes the computer to perform the steps of registering a user to a common distributed computing platform that provides access to a plurality of voice assistants, wherein each voice assistant is assigned to a location. The computer program product can also using a hardware processor receive at least a first command issued by a user to a first voice assistant of the plurality of voice assistants at a first location. The computer program product can also use a hardware processor to build a context database by storing the at least the first command on the distributed computing platform. The computer program product can also use the hardware process to receive at least a second command issued by the user that is received by a second voice assistant of the plurality of first assistants at a second location. The computer program product also includes a context assigning engine on the common distributed computing platform for analyzing the second command in comparison with the at least the first command on the context database, wherein similarity between the at least the first command and the second command provides context. The computer program product can also second the context from the context assigning engine to the second voice assistant, and employ the context to answer the second command.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
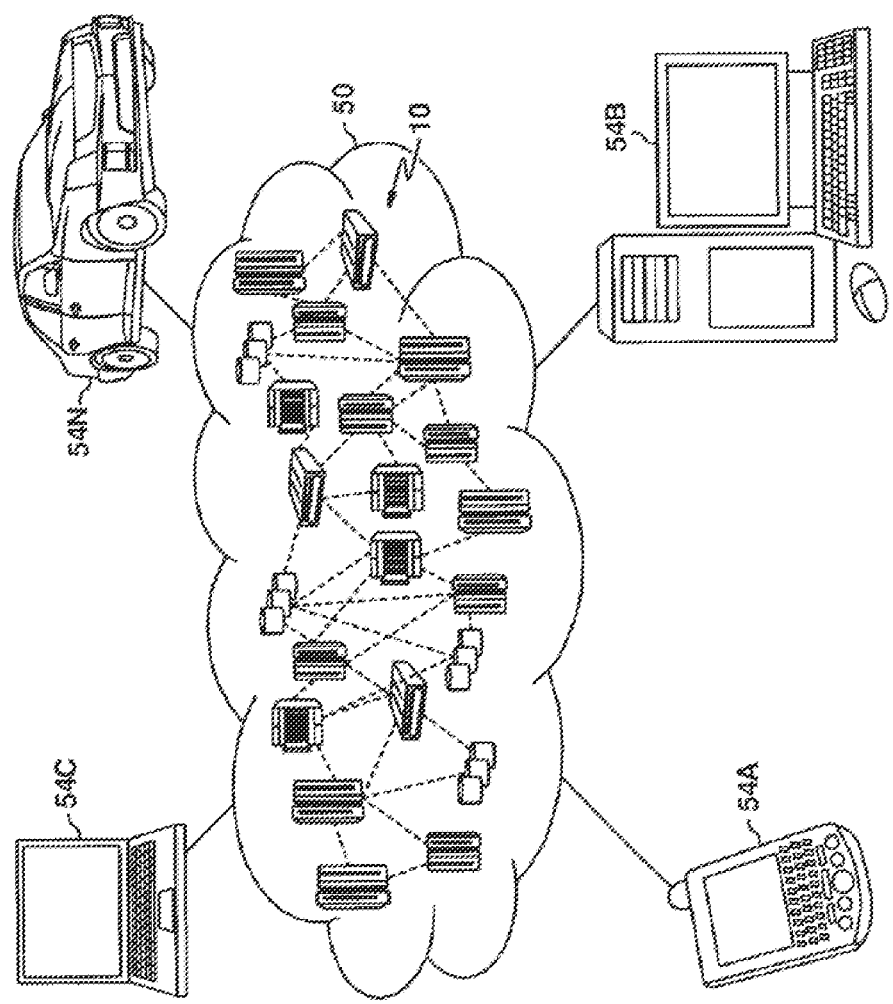
FIG. 6 depicts a cloud computing environment according to an embodiment of the present disclosure.

Referring now to FIG. 6, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 7:
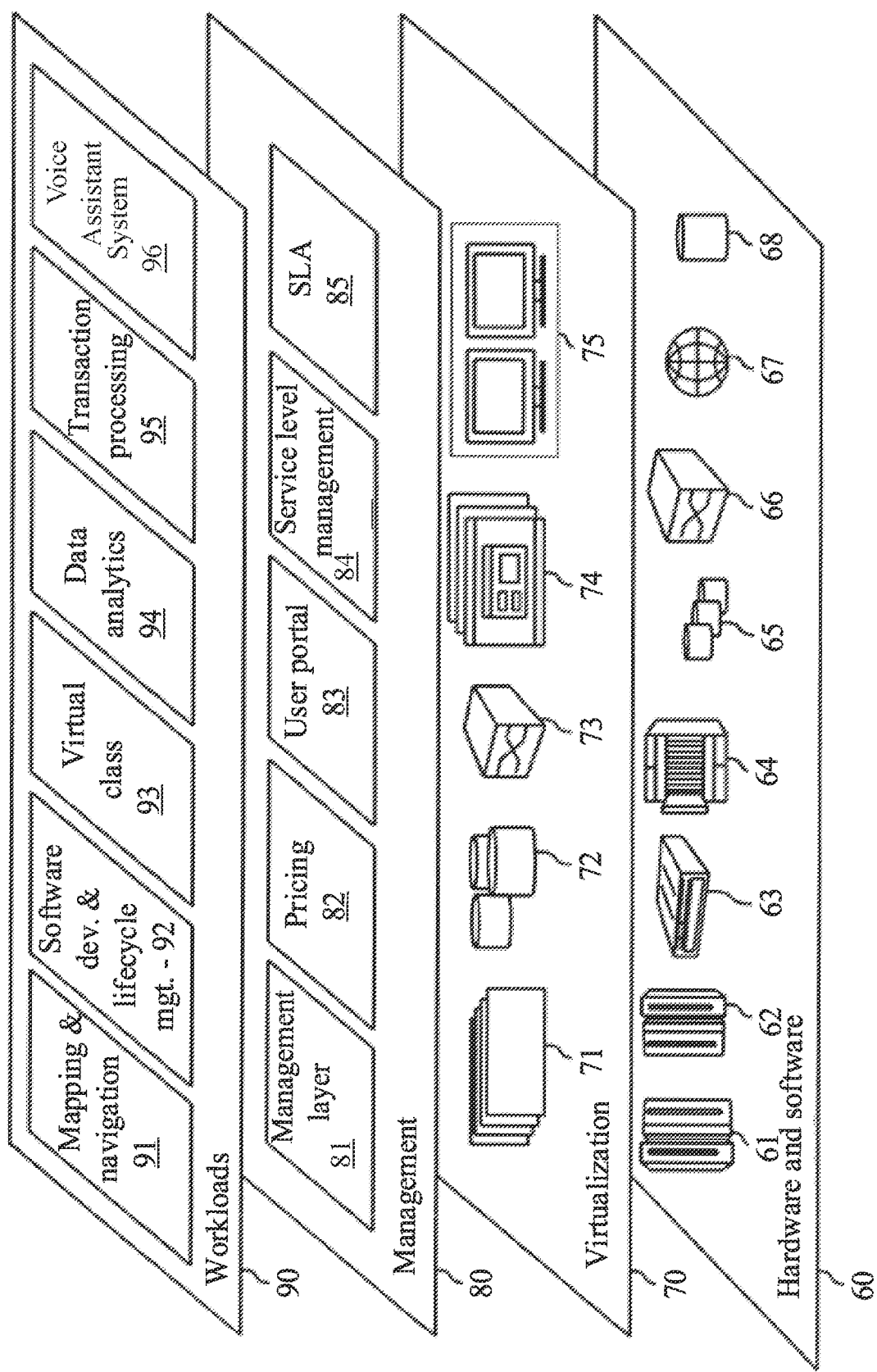
FIG. 7 depicts abstraction model layers according to an embodiment of the present disclosure.

Referring now to FIG. 7, a set of functional abstraction layers provided by cloud computing environment (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a system for using artificial intelligence voice assistants 96, e.g., the common distributed computing platform 13 includes a context database 14 and a context assigning engine 15, in accordance with FIGS. 1-7.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method for using artificial intelligence voice assistants comprising:
    registering a user to a common distributed computing platform that provides access to a plurality of diverse voice assistants, wherein each diverse voice assistant is assigned to a vendor location and are provided by different service providers;
    receiving at least one first command issued by a user to a first voice assistant of the plurality of diverse voice assistants at a first location;
    building a context database by storing the at least one first command on the common distributed computing platform;
    receiving at least one second command issued by the user to a second voice assistant of the plurality of diverse voice assistants at a second location;
    analyzing the at least one second command in comparison with the at least one first command on the context database, with a context assigning engine that utilizes a pre-attention bi-directional long short term memory (LSTM) model, an attention layer, and a post-attention bi-directional LSTM model of the common distributed computing platform, wherein similarity between the at least one first command and the at least one second command provides context;
    sending the context from the context assigning engine receiving to the second voice assistant; and
    employing the context to answer the at least one second command.

2. The computer-implemented method of claim 1, wherein the context is used to answer questions as the user is changing locations from the first location to the second location, wherein the context is used so that the user is not forced to repeat commands originally made to the first voice assistant from the plurality of diverse voice assistants that are provided by the different service providers.

3. The computer-implemented method of claim 1, wherein the common distributed computing platform is a cloud computing environment.

4. The computer-implemented method of claim 1, wherein registering the user to a common distributed computing platform includes a unique trigger for the user that the user employs to begin a virtual assistant session using the common distributed computing platform.

5. The computer-implemented method of claim 1, wherein the context assigning engine comprises a classifier model that is a fully connected neural network with softmax to classify at least one of the at least one first command and the at least one second command as context carryover or not based on attention weights determined by the attention layer of the fully connected neural network from the context as output of the pre-attention bi-directional LSTM model as an encoder.

6. The computer-implemented method of claim 5, wherein the classifier model of the context assigning engine is trained using the context database.

7. The computer-implemented method of claim 1, wherein a unique trigger starts a time period for recording the at least one first command and the at least one second command for determining context carryover.

8. A system for using artificial intelligence voice assistants comprising:
    a hardware processor; and
    a memory that stores a computer program product, the computer program product when executed by the hardware processor, causes the hardware processor to:

register a user to a common distributed computing platform that provides access to a plurality of diverse voice assistants, wherein each diverse voice assistant is assigned to a vendor location and are provided by different service providers;

receive at least one first command issued by a user to a first voice assistant of the plurality of diverse voice assistants at a first location;

build a context database by storing the at least one first command on the common distributed computing platform;

receive at least one second command issued by the user to a second voice assistant of the plurality of diverse voice assistants at a second location;

analyze the at least one second command in comparison with the at least one first command on the context database, with a context assigning engine that utilizes a pre-attention bi-directional long short term memory (LSTM) model, an attention layer, and a post-attention bi-directional LSTM model of the common distributed computing platform, wherein similarity between the at least one first command and the at least one second command provides context;

send the context from the context assigning engine receiving to the second voice assistant; and employ the context to answer the at least one second command.

9. The system of claim 8, wherein the context is used to answer questions as the user is changing locations from the first location to the second location, wherein the context is used so that the user is not forced to repeat commands originally made to the first voice assistant from the plurality of diverse voice assistants that are provided by the different service providers.

10. The system of claim 8, wherein the common distributed computing platform is a cloud computing environment.

11. The system of claim 8, wherein registering the user to a common distributed computing platform includes a unique trigger for the user that the user employs to begin a virtual assistant session using the common distributed computing platform.

12. The system of claim 8, wherein the context assigning engine comprises a classifier model that is a fully connected neural network with softmax to classify at least one of the at least one first command and the at least one second command as context carryover or not based on attention weights determined by an attention layer of the fully connected neural network from the context as output of the pre-attention bi-directional LSTM model as an encoder.

13. The system of claim 12, wherein the classifier model of the context assigning engine is trained using the context database.

14. The system of claim 8, wherein a unique trigger starts a time period for recording the at least one first command and the at least one second command for determining context carryover.

15. A computer program product for using artificial intelligence voice assistants comprising a computer readable storage medium having computer readable program code embodied therewith, the computer readable program code executable by a processor to cause the processor to:

register, using the processor, a user to a common distributed computing platform that provides access to a plurality of diverse voice assistants, wherein each voice assistant is assigned to a vendor location and are provided by different service providers;

receive, using the processor, at least one first command issued by a user to a first voice assistant of the plurality of diverse voice assistants at a first location;

build, using the processor, a context database by storing the at least one first command on the common distributed computing platform;

receive, using the processor, at least one second command issued by the user to a second voice assistant of the plurality of diverse voice assistants at a second location;

analyze, using the processor, the at least one second command in comparison with the at least one first command on the context database, with a context assigning engine that utilizes a pre-attention bi-directional long short term memory (LSTM) model, an attention layer, and a post-attention bi-directional LSTM model of the common distributed computing platform, wherein similarity between the at least one first command and the at least one second command provides context;

send, using the processor, the context from the context assigning engine receiving to the second voice assistant; and employ, using the processor, the context to answer the at least one second command.

16. The computer program product of claim 15, wherein the context is used to answer questions as the user is changing locations from the first location to the second location, wherein the context is used so that the user is not forced to repeat commands originally made to the first voice assistant from the plurality of diverse voice assistants that are provided by the different service providers.

17. The computer program product of claim 15, wherein the common distributed computing platform is a cloud computing environment.

18. The computer program product of claim 15, wherein registering the user to a common distributed computing platform includes a unique trigger for the user that the user employs to begin a virtual assistant session using the common distributed computing platform.

19. The computer program product of claim 15, wherein the context assigning engine comprises a classifier model that is a fully connected neural network with softmax to classify at least one of the at least one first command and the at least one second command as context carryover or not based on attention weights determined by an attention layer of the fully connected neural network from the context as output of the pre-attention bi-directional LSTM model as an encoder.

20. The computer program product of claim 19, wherein the classifier model of the context assigning engine is trained using the context database.

* * * * *